United States Patent Office 3,148,940
Patented Sept. 15, 1964

3,148,940
PREPARATION OF A HYDROXYLAMINE
COORDINATION COMPOUND
Kenneth O. Groves, Midland, Mich., assignor to The Dow Chemical Company, Midland, Mich., a corporation of Delaware
No Drawing. Filed July 1, 1960, Ser. No. 40,474
9 Claims. (Cl. 23—14)

This invention pertains to the preparation of a hydroxylamine coordination compound, and more particularly to the preparation of lithium perchlorate-hydroxylamine and magnesium perchlorate-hydroxylamine coordination compounds.

Hydroxylamine is a solid and theoretically should be an excellent oxidant for metallic fuels, such as aluminum, magnesium, beryllium, and mixtures thereof, in propellants. However, the instability of the compound has limited its use as an oxidant. The coordination compounds of hydroxylamine with lithium perchlorate and with magnesium perchlorate are solid compounds incorporating hydroxylamine. They are stable and can be used as oxidant in solid propellants.

It is thus an object of this invention to provide a method for the preparation of these compounds.

The above and other objects are attained according to the invention by intermixing hydroxylamine with lithium perchlorate or magnesium perchlorate in an inert solvent under anhydrous conditions to react the perchlorate with the hydroxylamine to form the coordination product, and recovering the product.

The reaction is carried out in an inert solvent in which at least both the perchlorate and hydroxylamine are partially soluble. A readily available solvent in which both the perchlorate and hydroxylamine are soluble is a lower aliphatic alcohol, such as methyl, ethyl, propyl, and butyl alcohols. Since hydroxylamine is relatively unstable, a solution of the hydroxylamine in the alcohol is generally prepared and the perchlorate is simply added to the alcohol solution to react the perchlorate with the hydroxylamine to obtain the coordination product. The product obtained is soluble in the reaction diluent and may be recovered from the reaction mixture to vacuum distillation, solvent extraction, or other methods. The most convenient method is to "salt out" the desired product by adding to the reaction mixture a low boiling second solvent which is miscible with the alcohol and in which the complex product is insoluble. For example, the addition to the reaction mixture of a low boiling non-polar organic solvent, such as butane, pentane and chloroform, or an aliphatic or alicyclic ether such as alkyl ethers having alkyl substituents of from 1 to 4 carbon atoms and tetrahydrofuran will result in the precipitation of the desired product. Cooling the reaction mixture will also improve the crystallization. At times it may be desirable to dissolve the perchlorate in an alkyl ether prior to adding the perchlorates to the hydroxylamine solution. With the addition of the solution of the perchlorate to the alcohol solution of the hydroxylamine, crystallization of the complex occurs. The recovery of the product generally can be further increased by the addition of more ether or some other miscible solvent. A product thus obtained may be filtered, washed, and dried under vacuum.

Room temperature is generally used as the reaction temperature. A temperature above room temperature may be used but no significant advantage is gained. In case of the lithium perchlorate-hydroxylamine product, a reaction temperature over 50° C. is seldom used. Even though the product will not decompose rapidly until its melting point of about 100° C., some decomposition of the product may be obtained at temperatures above 50° C. For the magnesium perchlorate-hydroxylamine product, a temperature up to the boiling point of the solvent or up to 150° C. may be used. A lower reaction temperature may also be used but no appreciable advantage is gained. However, if the method of recovering the desired complex from the reaction mixture is by means of crystallization, cooling the reaction mixture to a temperature of about 0 to 10° C. decreases the solubility of the product. Thus, a higher yield may be obtained. Also the filterability of the product is improved by maintaining the reaction mixture at the lower temperatures for from 1 to 2 hours to allow for crystal growth. In the reaction anhydrous reactants and solvents must be used. If even small amounts of water are present, a perchlorate hydrate type product is obtained.

Generally, the hydroxylamine coordination product crystallized by the addition of a second solvent to the reaction mixture is of sufficient purity for most uses. However, the product may be further purified by recrystallization or by selective dissolution. The magnesium perchlorate-hydroxylamine compound obtained generally contains a small residue of magnesium oxide and may be most conveniently purified by using a solvent which will dissolve the complex but not the magnesium oxide. After the product is dissolved, the resulting solution may be evaporated to obtain the complex. The lower aliphatic alcohols may be used as solvents to preferentially dissolve the complex.

The following examples further illustrate the invention.

Example I

A solution of hydroxylamine was prepared by reacting sodium ethoxide with hydroxylamine hydrochloride in ethyl alcohol and filtering off the precipitated sodium chloride. To 40 milliliters of the hydroxylamine-ethyl alcohol solution containing 0.66 gram of hydroxylamine per milliliter, 4.24 grams of anhydrous lithium chlorate dissolved in 50 milliliters of anhydrous ether were added while the mixture was being stirred. Some precipitation of the complex was obtained. After the addition of the lithium perchlorate, isopentane was added to increase the crystallization of the desired product. The isopentane was added in an amount to saturate the solution without the formation of a second immiscible phase. The precipitate obtained was filtered, washed with ethyl ether, and dried under vacuum to give about 3 grams.

Example II

A magnesium perchlorate-hydroxylamine coordination product was prepared using 40 milliliters of hydroxylamine-ethyl alcohol solution prepared in a manner similar to that described in Example I. The hydroxylamine-ethyl alcohol solution contained about 0.66 gram of hydroxylamine per milliliter. To this solution 4.46 grams of anhydrous magnesium perchlorate were added. After intermixing the magnesium perchlorate with the hydroxylamine, approximately 125 milliliters of anhydrous ethyl ether were added which had a salting out effect and resulted in the precipitation of the product. The precipitate was recovered from the reaction mixture by filtration and purified by dissolving the magnesium perchlorate-hydroxylamine product in methyl alcohol. Approximately 200 milliliters of methyl alcohol were used for each 5 grams of reaction product. The magnesium perchlorate hydroxylamine product dissolved in the alcohol and the undesirable precipitate was removed by filtration. The methanol filtrate obtained was evaporated to dryness yielding a substantially pure product of magnesium perchlorate hydroxylamine coordination product in an amount of about 3 grams.

What is claimed is:
1. A process for the preparation of a hydroxylamine coordination compound which comprises dissolving under anhydrous conditions hydroxylamine and a perchlorate selected from the group consisting of lithium perchlorate and magnesium perchlorate in an inert solvent in which the perchlorate and the hydroxylamine are at least partially soluble to react the perchlorate with the hydroxylamine to form a coordination product, and recovering the coordination product from the reaction mixture.

2. A process for the preparation of a hydroxylamine coordination compound which comprises dissolving hydroxylamine in a lower alkyl alcohol, adding to the resulting hydroxylamine solution a perchlorate selected from the group consisting of lithium perchlorate and magnesium perchlorate to react the perchlorate with the hydroxylamine under anhydrous conditions to form a coordination product, and recovering the coordination product from the reaction mixture.

3. A process according to claim 2 wherein the perchlorate is lithium perchlorate.

4. A process according to claim 2 wherein the perchlorate is magnesium perchlorate.

5. A process for the preparation of hydroxylamine perchlorate coordination product which comprises dissolving the hydroxylamine in a lower alkyl alcohol to form a solution of the hydroxylamine in the alcohol, adding to the solution a perchlorate selected from the group consisting of lithium perchlorate and magnesium perchlorate to react the perchlorate with the hydroxylamine to form a coordination compound, intermixing with the reaction mixture a low boiling non-polar organic diluent to precipitate the hydroxylamine-perchlorate complex, said non-polar organic solvent being miscible with the lower alkyl alcohol and a non-solvent for the coordination product, and recovering the precipitated coordination product from the resulting mixture.

6. A process according to claim 5 wherein the perchlorate is lithium perchlorate.

7. A process according to claim 6 wherein the lower alkyl alcohol is ethyl alcohol and the non-polar organic diluent is ethyl ether.

8. A process for the preparation of a hydroxylamine-magnesium perchlorate complex, which comprises dissolving hydroxylamine in a lower alkyl alcohol, adding magnesium perchlorate to the alcohol solution of hydroxylamine to react the perchlorate with the hydroxylamine in the solution to obtain a coordination product, intermixing with the reaction mixture a low boiling non-polar organic diluent to precipitate the hydroxylamine-magnesium perchlorate product, said non-polar organic diluent being miscible with the lower alkyl alcohol and a non-solvent for the coordination product, recovering the precipitate from the resulting mixture, treating the recovered precipitate with an alkanol to dissolve the hydroxylamine-magnesium perchlorate complex from the precipitated mass and recovering the hydroxylamine-magnesium perchlorate complex from the resulting solution.

9. A process according to claim 8 wherein the lower alkyl alcohol is ethyl alcohol and the non-polar organic solvent is ethyl ether.

References Cited in the file of this patent
UNITED STATES PATENTS
2,768,874    Robson _____ Oct. 30, 1956